US012412708B2

(12) United States Patent
Unterreiner et al.

(10) Patent No.: US 12,412,708 B2
(45) Date of Patent: Sep. 9, 2025

(54) ON-LOAD TAP CHANGER MODULE

(71) Applicant: Maschinenfabrik Reinhausen GmbH, Regensburg (DE)

(72) Inventors: Nikolaus Unterreiner, Regensburg (DE); Robert Hiltner, Bernhardswald (DE); Stefan Feldmeier, Bernhardswald (DE); Christian Muenzberg, Biburg (DE); Markus Meyer, Hemau (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 58 days.

(21) Appl. No.: 18/042,221

(22) PCT Filed: Jul. 21, 2021

(86) PCT No.: PCT/EP2021/070380

§ 371 (c)(1),
(2) Date: Feb. 20, 2023

(87) PCT Pub. No.: WO2022/042954

PCT Pub. Date: Mar. 3, 2022

(65) Prior Publication Data

US 2023/0317382 A1 Oct. 5, 2023

(30) Foreign Application Priority Data

Aug. 27, 2020 (DE) ..................... 10 2020 122 453.2

(51) Int. Cl.
*H01H 9/00* (2006.01)

(52) U.S. Cl.
CPC ........ *H01H 9/0044* (2013.01); *H01H 9/0016* (2013.01)

(58) Field of Classification Search
CPC .. H01H 9/00; H01H 9/16; H01H 9/44; H01H 9/0005; H01H 9/0027; H01H 9/02; H01H 9/0271; H01H 15/00; H01H 15/08; H01H 19/12; H01H 2009/00; H01H 2009/0005; H01H 2009/0016; H01H 2009/0022; H01H 2009/0044; H01H 2009/0088; H01H 2009/02
USPC ........................................................ 200/52 R
See application file for complete search history.

(56) References Cited

U.S. PATENT DOCUMENTS

| | | | | |
|---|---|---|---|---|
| 9,455,658 B2 * | 9/2016 | Kammerl | ................ | H02P 13/06 |
| 2015/0091684 A1 | 4/2015 | Pankofer et al. | | |
| 2019/0066940 A1 | 2/2019 | Meyer et al. | | |
| 2019/0228922 A1 * | 7/2019 | Stocker | ................... | H01F 29/04 |

(Continued)

FOREIGN PATENT DOCUMENTS

| | | |
|---|---|---|
| CN | 109411254 A | 3/2019 |
| CN | 209418349 A | 9/2019 |
| DE | 102016104500 B3 | 5/2017 |

(Continued)

*Primary Examiner* — Anthony R Jimenez
(74) *Attorney, Agent, or Firm* — LEYDIG, VOIT & MAYER, LTD.

(57) ABSTRACT

An on-load tap changer module for an on-load tap changer, including a carrier, a diverter switch with a vacuum interrupter and a bridge switch, a selector, a change-over selector, and a drive module, wherein the diverter switch, the selector, and the change-over selector are arranged on the carrier and are activated centrally by the drive module.

12 Claims, 5 Drawing Sheets

(56) References Cited

U.S. PATENT DOCUMENTS

| | | | |
|---|---|---|---|
| 2022/0392717 | A1 | 12/2022 | Hiltner et al. |

FOREIGN PATENT DOCUMENTS

| | | | |
|---|---|---|---|
| DE | 102016117526 | B3 | 2/2018 |
| DE | 102019131169 | B3 | 2/2021 |
| RU | 2621070 | C2 | 5/2017 |

* cited by examiner

ON-LOAD TAP CHANGER MODULE

CROSS REFERENCE TO RELATED APPLICATIONS

This application is a U.S. National Phase application under 35 U.S.C. § 371 of International Application No. PCT/EP2021/070380, filed on Jul. 21, 2021, and claims benefit to German Patent Application No. DE 10 2020 122 453.2, filed on Aug. 27, 2020. The International Application was published in German on Mar. 3, 2022 as WO 2022/042954 A1 under PCT Article 21(2).

FIELD

The invention relates to an on-load tap changer module for an on-load tap changer.

BACKGROUND

On-load tap-changers usually have a diverter switch and a selector. The diverter switch with the vacuum interrupters and the transition resistors is arranged in a cylindrical vessel. The selector is made up of a multiplicity of bars arranged in a circle. Contacts which serve as connections for a tap winding are arranged at different levels on said bars. Two selector arms are secured to a switching pillar within the selector. They make contact with the contacts on the bars. The diverter switch and selector are connected to each other via a gear unit. The motor drive is arranged on the outside of the tap transformer and is connected to the on-load tap changer via a drive shaft. This structure requires a lot of structural space and is complex and expensive.

SUMMARY

In an embodiment, the present disclosure provides an on-load tap changer module for an on-load tap changer, comprising a carrier, a diverter switch with a vacuum interrupter and a bridge switch, a selector, a change-over selector, and a drive module, wherein the diverter switch, the selector, and the change-over selector are arranged on the carrier and are activated centrally by the drive module.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

The invention and its advantages are described in more detail below with reference to the attached drawings. In the drawings.

DETAILED DESCRIPTION

Figure 1:
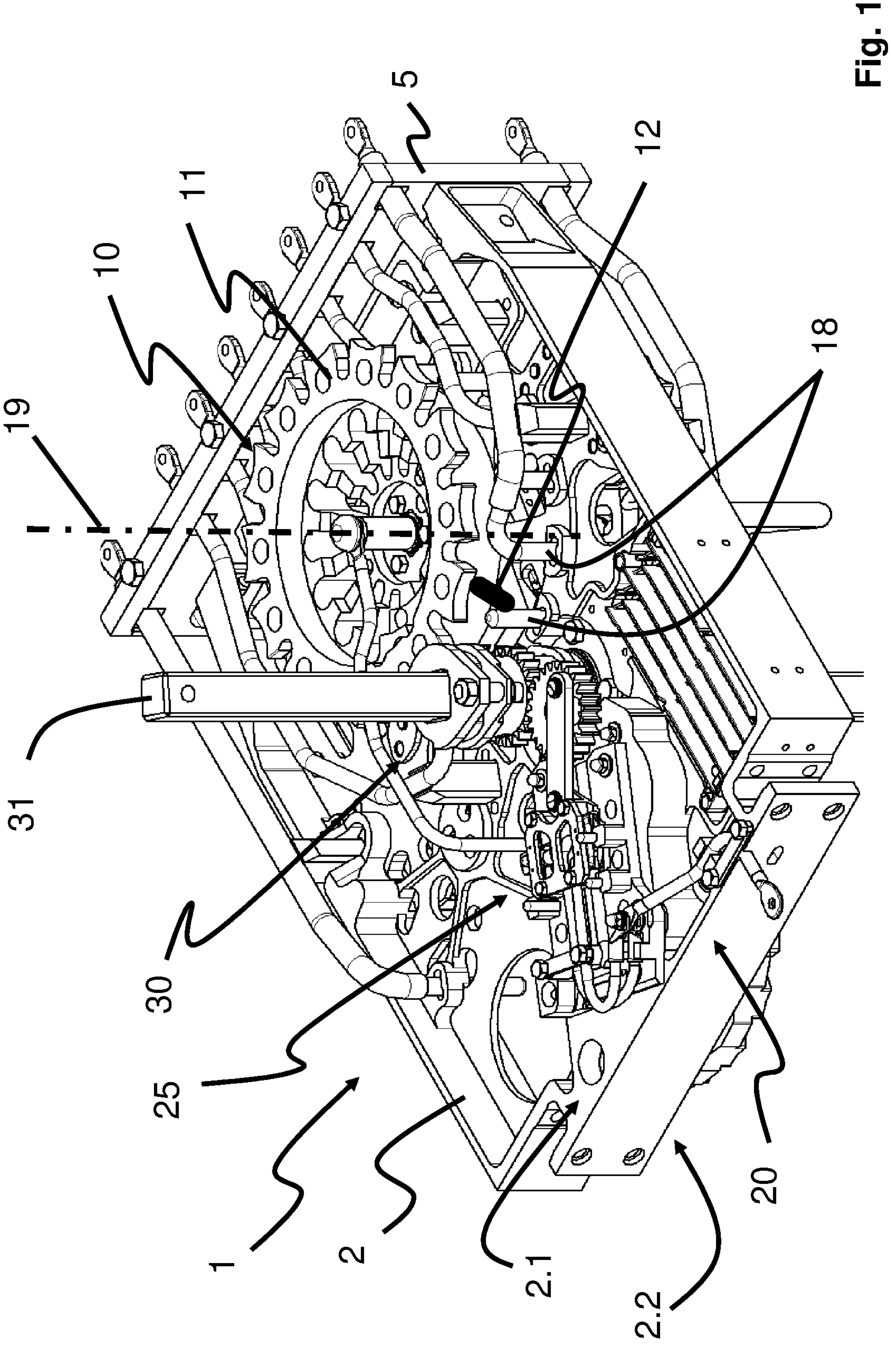
FIG. 1 illustrates a first side of an on-load tap changer module.

In an embodiment, the present invention provides an on-load tap changer module for an on-load tap changer which has a simple and compact structure and nevertheless thus ensures secure operation.

In an embodiment, an on-load tap changer module is provided for an on-load tap changer, comprising:

- a carrier, a diverter switch with a vacuum interrupter and a bridge switch, a selector, a change-over selector, a drive module, wherein:

- the diverter switch, the selector, and the change-over selector are arranged on the carrier and are activated centrally by the drive module.

Because all the parts of the diverter switch, the selector, and the change-over selector are arranged on a single carrier, the on-load tap changer module is particularly compact. An on-load tap changer with the on-load tap changer module is thus also particularly small and takes up a small amount of structural space inside a tap transformer. The design of the on-load tap changer module furthermore enables central activation of all the parts via a common drive module. The drive module is here arranged centrally, i.e. in the middle between the diverter switch, the selector, and the change-over selector. In other words, the drive module is encircled by the diverter switch, the selector, and the change-over selector. In spite of the central arrangement of the drive module and the compact structure, the potential-conducting parts are still safely spaced apart from one another. The central activation furthermore makes it possible, by virtue of the drive module, to carry out all the change-overs precisely.

The carrier can be designed in any desired fashion and be produced, for example, as a plate or plate-like injection-molded part. The carrier can be made from plastic, fiberglass-reinforced plastic, or any other electrically insulating material.

The diverter switch can be designed in any desired fashion and have, for example, one or more vacuum interrupters and one or more bridge switches. The bridge switch can be activated by a linear or rotational movement.

The selector can be designed in any desired fashion and have, for example, one or more selector arms. A selector arm can be designed in any desired fashion and be configured, for example, as a Geneva wheel or a toothed wheel. The selector furthermore has a plurality of selector contacts which can, for example, have a T-shaped or L-shaped design such that, on the one hand, they extend from one side of the carrier to a second side of the carrier and, on the other hand, they project to a side wall of the carrier, where they are connected to the winding taps of a tap winding. The first side of the carrier is arranged opposite the second side of the carrier.

The drive module can be designed in any desired fashion and consist, for example, of a drive shaft and at least one activating element. The drive shaft and the activating element can be configured as a single piece or multiple pieces. The activating element can be configured as a toothed wheel, cam contour, partially toothed wheel, driver, or dual driver.

According to an embodiment, a plurality of activating elements can be arranged on or at the drive shaft. The plurality of activating elements can be configured as a single piece or multiple pieces. The activating elements can be connected to one another, for example, by an adhesive, screwed, or plugged-together connection.

Each activating element can be designed in any desired fashion and directly or indirectly activate or drive selectors or change-over selectors, diverter switches, or parts thereof. Alternatively, an activating element can activate a plurality of elements such as, for example, selectors and change-over selectors. Furthermore, a plurality of activating elements can activate a selector, in particular a first selector arm and a second selector arm.

The drive module can be designed in any desired fashion and be arranged essentially centrally in the middle of the carrier, encircled or surrounded by selectors, change-over selectors, and diverter switches. The drive module can be arranged centrally, i.e. in the geometrical center of the carrier or approximately in the geometrical center of the carrier.

It can be provided that three on-load tap changer modules are connected to one another via, for example, bars, a plurality of plates, or a frame and are activated by means of a motor and consequently form an on-load tap changer.

The on-load tap changer can as required be designed in any desired fashion and be designed, for example, as a resistor-type high-speed tap changer or a reactor-type tap changer.

FIG. 1 shows an on-load tap changer module 1 according to an embodiment of the invention for an on-load tap changer 9. The on-load tap changer module 1 has a carrier 2 which is made from a plastic, fiberglass-reinforced plastic, or another electrically insulating material. This carrier 2 is either designed as a milled part or is produced by means of an injection-molding process. A first selector arm 11 of a selector 10, and a bridge switch 25 of a diverter switch 20, are arranged on a first side 2.1 of the carrier 2. The first selector arm 11 is configured as a Geneva wheel. The first selector arm 11 is mounted rotatably and performs a rotational movement about a selector axis 19. Furthermore, the first selector arm 11 carries at least one first sliding contact 12. Selector contacts 18 are arranged in a circle about the selector 10, i.e. the first selector arm 11. The selector contacts 18 are configured in such a way that they, on the one hand, extend from the first side 2.1 of the carrier 2 to the second side 2.2 of the carrier and, on the other hand, are routed to a first side wall 5 of the carrier 2. Specifically, the selector contacts 18 have a T-shaped or L-shaped design.

The bridge switch 25 has a housing with contacts fastened thereon. Furthermore, the bridge switch 25 has a plurality of fixed contacts. The fixed contacts are fastened to the carrier 2 and also project from the first side 2.1 of the carrier 2 to the second side 2.2 of the carrier 2. The housing is connected to a toothed wheel via a connecting rod. The contacts on the housing of the bridge switch 25 are connected to a load take-off lead.

Figure 2:
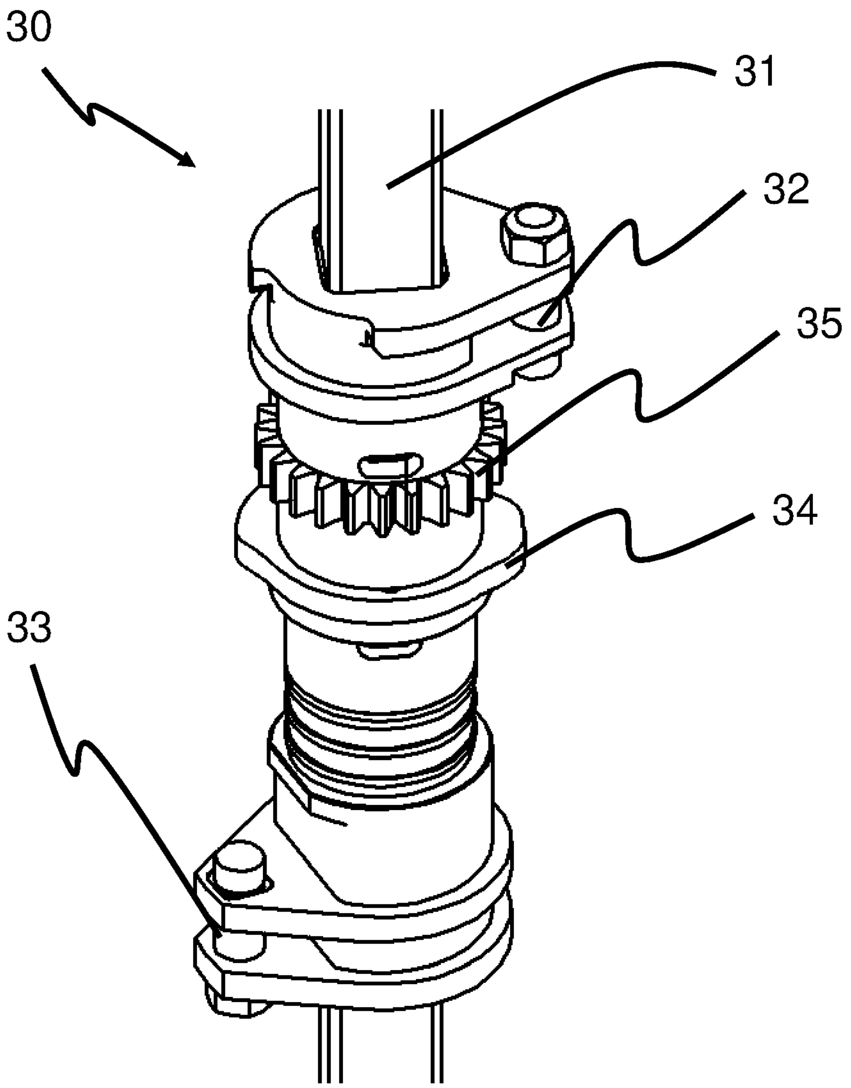
FIG. 2 illustrates a drive module for an on-load tap changer module.

A drive module 30 is furthermore arranged on the carrier 2. It has, inter alia, a drive shaft 31 which is configured as a hollow or solid plastic square shaft. The drive shaft 31 also extends from a first side 2.1 of the carrier 2 to a second side 2.2 of the carrier 2. The drive module 30 is arranged essentially between the selector 10 and the diverter switch 20. A plurality of activating elements are arranged on the drive shaft 31, as illustrated in FIG. 2, in particular a first driver 32, a cam driver 34, and a drive toothed wheel 35. The first activating element, i.e. the first driver 32, activates the first selector arm 11 of the selector 10. The fourth activating element, i.e. the drive toothed wheel 35, activates the bridge switch 25 of the diverter switch 20. The third activating element, i.e. the cam driver 34, activates a vacuum interrupter 21 of the diverter switch 20.

Figure 3:
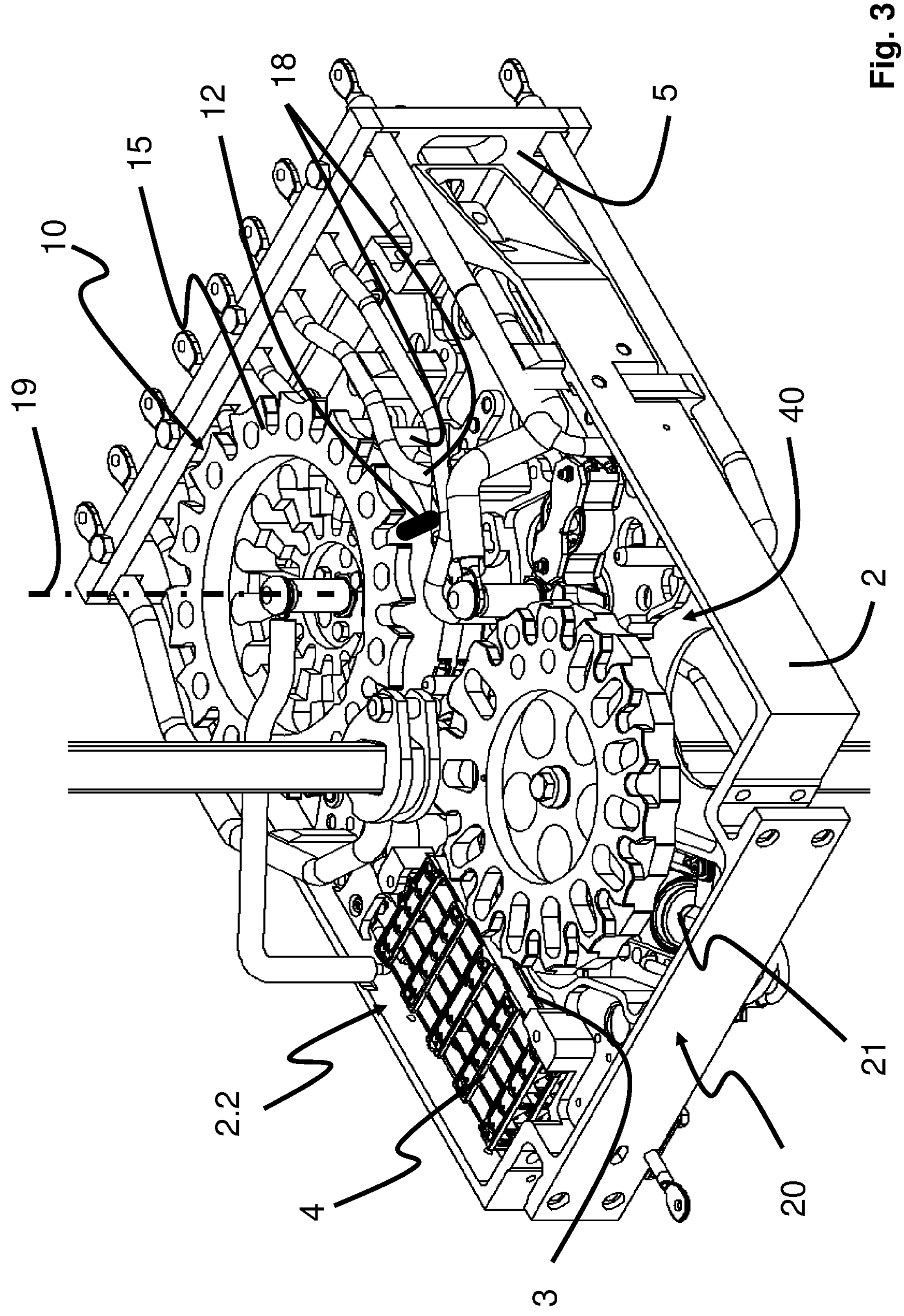
FIG. 3 illustrates a second side of an on-load tap changer module.

FIG. 3 shows the second side 2.2 of the carrier 2. The second selector arm 15 of the selector 10 is arranged here. The second selector arm 15 is also configured as a Geneva wheel. The second selector arm 15 is mounted rotatably and also performs a rotational movement about the selector axis 19. The second selector arm 15 furthermore carries at least one second sliding contact 12. Selector contacts 18 are arranged in a circle around the selector 10, i.e. the second selector arm 15. The selector contacts 18 are configured in such a way that, on the one hand, they extend from the second side 2.2 of the carrier 2 to the first side 2.1 of the carrier and, on the other hand, are routed to a first side wall 5 of the carrier 2. As already described, the selector contacts 18 have a T-shaped or L-shaped design.

Furthermore, the vacuum interrupter 21 of the diverter switch 20 is arranged on the second side 2.2 of the carrier 2. It is fixed on the carrier 2, inter alia, by means of a bearing block. A transition resistor 4 is arranged on the second side 2.2 of the carrier 2 and is connected to the on-load tap changer module 1 via a connecting element 3.

Figure 4:
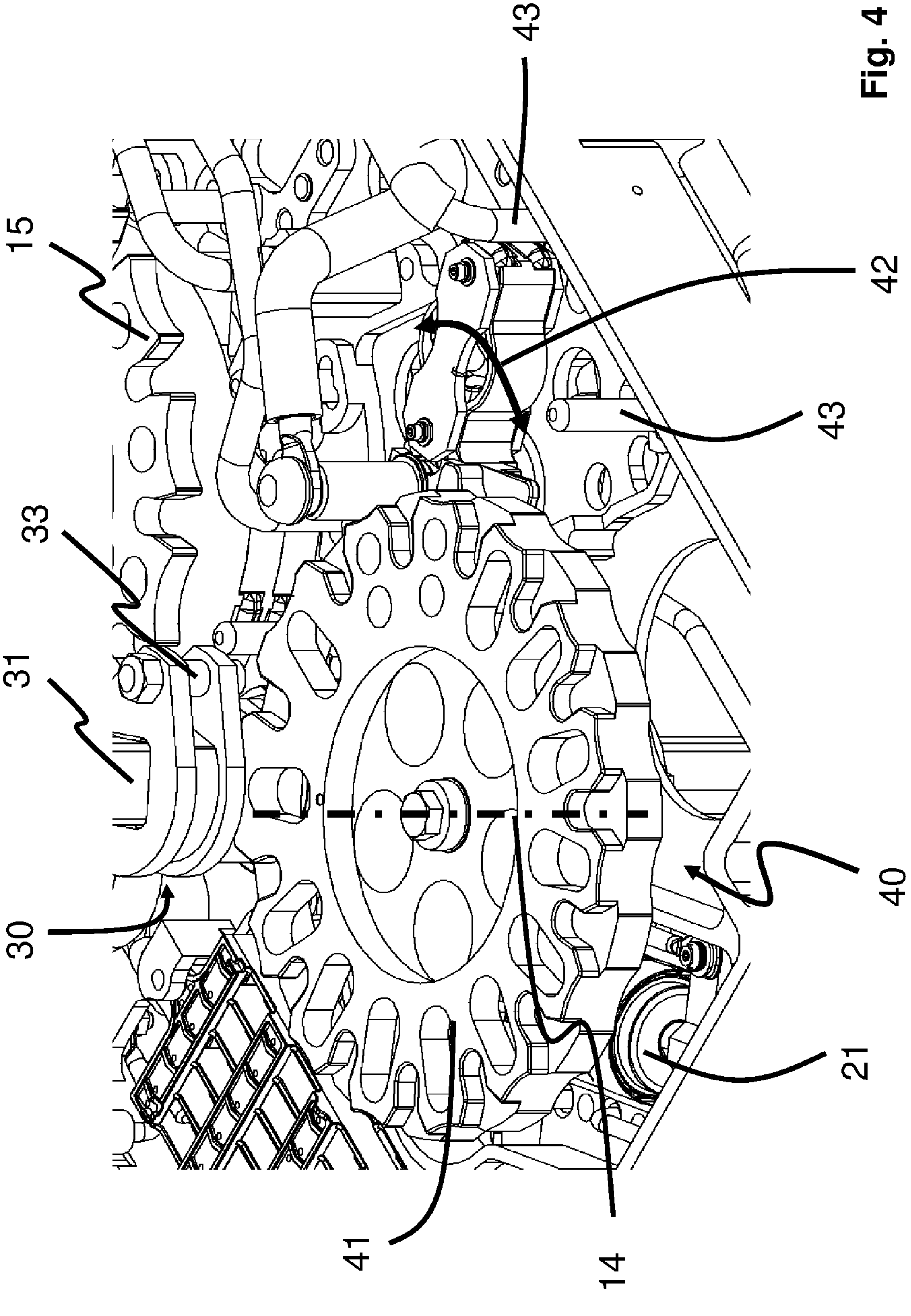
FIG. 4 illustrates a detailed view of a change-over selector.

As can be seen in FIG. 4, a change-over selector 40 is moreover arranged on the second side 2.2 of the carrier 2. It has a change-over selector arm 41 which is also configured as a Geneva wheel. The first change-over selector arm 41 is rotatably mounted and also performs a rotational movement about the change-over selector axis 44. Additionally, the change-over selector 40 has a change-over selector swing arm 42 which can switch between two change-over selector contacts 43 by means of a pivoting movement.

Furthermore, a further part of the drive module 30 is arranged on the carrier 2. It has the already mentioned drive shaft 31. The drive module 30 is arranged essentially between the selector 10, the diverter switch 20, and the change-over selector 40. A second activating element, i.e. the second driver 33, is arranged here on the drive shaft 31. The second driver 33 has a first catch and a second catch by means of which the second selector arm 15 of the selector 10, and the change-over selector swing arm 42, are activated via the change-over selector arm 41 of the change-over selector 40.

Figure 5:
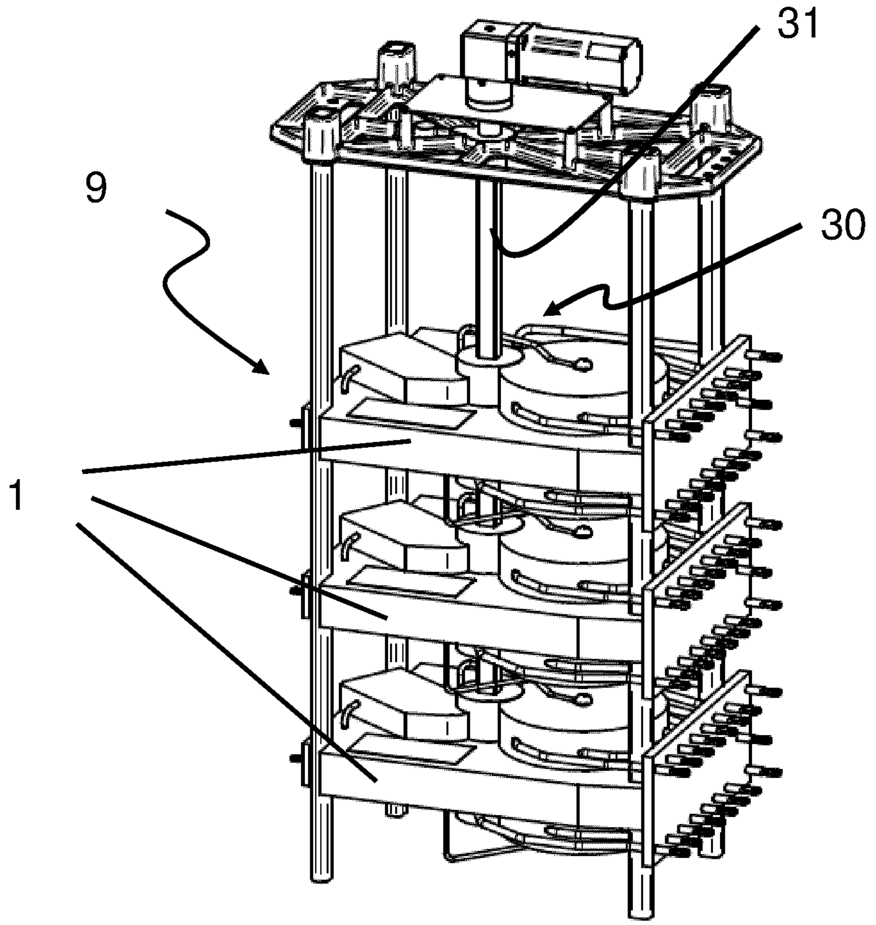
FIG. 5 illustrates an on-load tap changer with three on-load tap changer modules.

FIG. 5 shows an on-load tap changer 9 with three on-load tap changer modules 1 which are activated via a motor by means of a common drive module 30 and its drive shaft 31.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.P

LIST OF REFERENCE SIGNS

1 on-load tap changer module
2 carrier
2.1 first side of 2
2.2 second side of 2
3 connecting element
4 transition resistor
5 first side wall of 3
9 on-load tap changer
10 selector
11 first selector arm
12 first sliding contact
15 second selector arm
16 second sliding contact
18 selector contacts
19 selector axis
20 diverter switch
21 vacuum interrupter
25 bridge switch
30 drive module
31 drive shaft
32 first driver/first activating element
33 second driver/second activating element
34 cam driver for vacuum interrupter/third activating element
35 drive toothed wheel for bridge switch/fourth activating element
40 change-over selector
41 change-over selector arm
42 change-over selector swing arm
43 change-over selector contact
44 change-over selector axis

The invention claimed is:

1. An on-load tap changer module for an on-load tap changer, the on-load tap changer module comprising:
a single carrier, which is a single plate;
a diverter switch comprising a vacuum interrupter and a bridge switch;
a selector;
a change-over selector; and
a drive module,
wherein the diverter switch, the selector, and the change-over selector are arranged on the carrier and are configured to be centrally activated by the drive module.

2. The on-load tap changer module as claimed in claim 1, wherein the drive module comprises a drive shaft with at least one activating element.

3. The on-load tap changer module as claimed in claim 1, wherein the selector, the change-over selector, and the diverter switch are distributed evenly on the carrier and are arranged around the drive module.

4. The on-load tap changer module as claimed in claim 1, wherein:
the selector has a plurality of selector contacts,
the selector contacts are arranged in a circle and extend from a first side of the carrier to a second side of the carrier, and
the selector contacts are routed to a first side wall of the carrier.

5. The on-load tap changer module as claimed in claim 1, wherein the carrier has a connecting element for a transition resistor or a reactor.

6. The on-load tap changer module as claimed in claim 1, wherein the drive module is arranged on the carrier centrally between the diverter switch, the selector, and the change-over selector, wherein the drive module comprises at least one activating element arranged on a drive shaft, the at least one activating element being configured as a toothed wheel, cam contour, partially toothed wheel, driver, or dual driver, and wherein the at least one activating element is configured to directly or in directly activate the diverter switch, the selector, and the change-over selector.

7. The on-load tap changer module as claimed in claim 1, wherein the drive module comprises:
a first activating element that is configured to activate a first selector arm of the selector,
a second activating element that is configured to activate a second selector arm of the selector,
a third activating element that is configured to activate the vacuum interrupter of the diverter switch, and
a fourth activating element that is configured to activate the bridge switch of the diverter switch.

8. The on-load tap changer module as claimed in claim 7, wherein the second activating element is configured to activate the change-over selector.

9. The on-load tap changer module as claimed in claim 7, wherein the first, second, third, and fourth activating elements are designed as a single piece or multiple pieces.

10. An on-load tap changer module for an on-load tap changer, the on-load tap changer module comprising:
a carrier;
a diverter switch comprising a vacuum interrupter and a bridge switch;
a selector;
a change-over selector; and
a drive module,
wherein the diverter switch, the selector, and the change-over selector are arranged on the carrier and are configured to be centrally activated by the drive module,
wherein the drive module comprises:
a first activating element that is configured to activate a first selector arm of the selector,
a second activating element that is configured to activate a second selector arm of the selector,
a third activating element that is configured to activate the vacuum interrupter of the diverter switch, and
a fourth activating element that is configured to activate the bridge switch of the diverter switch.

11. The on-load tap changer module as claimed in claim 10, wherein the second activating element is configured to activate the change-over selector.

12. An on-load tap changer module for an on-load tap changer, the on-load tap changer module comprising:
a single carrier, which is a single plate;
a diverter switch comprising a vacuum interrupter and a bridge switch;
a selector;
a change-over selector; and
a drive module,
wherein the diverter switch, the selector, and the change-over selector are arranged on the carrier and are configured to be centrally activated by the drive module,
wherein the drive module is arranged on the carrier centrally between the diverter switch, the selector, and the change-over selector, wherein the drive module comprises at least one activating element arranged on a drive shaft, the at least one activating element being configured as a toothed wheel, cam contour, partially toothed wheel, driver, or dual driver, and wherein the at least one activating element is configured to directly or in directly activate the diverter switch, the selector, and the change-over selector.

* * * * *